(12) United States Patent
Chaloupka et al.

(10) Patent No.: US 11,493,907 B2
(45) Date of Patent: Nov. 8, 2022

(54) DATA ACQUISITION SYSTEM, SYSTEM AND METHOD FOR REAL-TIME IN-LINE MONITORING OF INDUSTRIAL MANUFACTURING PROCESSES

(71) Applicant: NETZSCH Process Intelligence GmbH, Selb (DE)

(72) Inventors: Alexander Chaloupka, Ingenried (DE); Marco Zier, Fichtelberg (DE); Bernd Bohanka, Helmbrechts (DE); Elena Moukhina, Selb (DE); Thilo Hilpert, Selb (DE); Simon Popp, Streitau (DE)

(73) Assignee: NETZSCH Process Intelligence GmbH, Selb (DE)

( * ) Notice: Subject to any disclaimer, the term of this patent is extended or adjusted under 35 U.S.C. 154(b) by 0 days.

(21) Appl. No.: 16/886,866

(22) Filed: May 29, 2020

(65) Prior Publication Data

US 2021/0041857 A1 Feb. 11, 2021

(30) Foreign Application Priority Data

Aug. 7, 2019 (DE) .......................... 102019121281.2

(51) Int. Cl.
*G05B 19/418* (2006.01)
*G01N 27/22* (2006.01)

(52) U.S. Cl.
CPC ....... *G05B 19/4188* (2013.01); *G01N 27/221* (2013.01); *G05B 2219/31001* (2013.01)

(58) Field of Classification Search
CPC ...... G05B 19/4188; G05B 2219/31001; G05B 19/41875; G05B 19/414; G05B 13/024;
(Continued)

(56) References Cited

U.S. PATENT DOCUMENTS

2005/0114089 A1* 5/2005 Celestini ............ G05B 23/0264
702/186
2015/0106912 A1 4/2015 Brandon et al.
(Continued)

FOREIGN PATENT DOCUMENTS

CN 109342514 A * 2/2019
DE 4446857 A1 6/1995
(Continued)

OTHER PUBLICATIONS

Lawrence et al. "An approach to couple mold design and on-line control to manufacture complex composite parts by resin transfer molding" Composites Journal, Nov. 14, 2001, pp. 981-990 (Year: 2001).*

(Continued)

*Primary Examiner* — Chad G Erdman
(74) *Attorney, Agent, or Firm* — Whitmyer IP Group LLC

(57) ABSTRACT

A data acquisition system for dielectric analysis measurements, including a sensor interface configured to connect to one or more sensors located within an active machining zone of an industrial manufacturing machine, a module processor coupled to the sensor interface and configured to receive measurement values from one or more sensors connected to the sensor interface, a cloud interface coupled to the module processor, and a machine interface coupled to the module processor. The measurement values indicate physical properties of workpieces processed in the active machining zone of an industrial manufacturing machine. The cloud interface is configured to connect to cloud-based resources, and the machine interface is configured to connect to a controller of the industrial manufacturing machine. The module processor is configured to transmit the received measurement values from the one or more dielectric sensors to cloud-based resources via the cloud interface and to transmit manufacturing control signals to the controller of the indus- (Continued)

trial manufacturing machine via the machine interface, the manufacturing control signals being based on parameters received from cloud-based resources via the cloud interface.

14 Claims, 2 Drawing Sheets

(58) Field of Classification Search
CPC ....... G01N 27/221; Y02P 90/02; B29C 70/48; H04L 67/025; H04L 12/66
See application file for complete search history.

(56) References Cited

U.S. PATENT DOCUMENTS

| | | | |
|---|---|---|---|
| 2018/0052451 A1* | 2/2018 | Billi-Duran | G05B 19/41835 |
| 2018/0164764 A1 | 6/2018 | Weatherbee et al. | |
| 2018/0340900 A1* | 11/2018 | Reifsnider | G01N 27/026 |
| 2020/0006100 A1* | 1/2020 | Clark | H01L 22/12 |

FOREIGN PATENT DOCUMENTS

| | | |
|---|---|---|
| DE | 10152765 A1 | 5/2003 |
| DE | 102017202360 A1 | 8/2018 |
| GB | 2521376 A | 6/2015 |
| JP | 2002532690 A * | 10/2002 |
| WO | 2018101061 A1 | 6/2018 |
| WO | 2018142977 A1 | 8/2018 |

OTHER PUBLICATIONS

Lawrence, J. M., et al; Abstract of "An approach to couple mold design and on-line control to manufacture complex composite parts by resin transfer molding"; Composites Part A: Applied Science and Manufacturing, Elsevier, vol. 33, Issue No. 7; Amsterdam, NL; Jul. 1, 2002; 2 Pages.

European Search Report; Application No. EP 20 17 6412; dated Jan. 20, 2021; 2 Pages.

* cited by examiner

DATA ACQUISITION SYSTEM, SYSTEM AND METHOD FOR REAL-TIME IN-LINE MONITORING OF INDUSTRIAL MANUFACTURING PROCESSES

TECHNICAL FIELD

The present invention pertains to a data acquisition system, in particular for dielectric analysis (DEA) measurements, as well as systems and methods for real-time in-line monitoring of industrial manufacturing processes. Although applicable for any kind of industrial manufacturing system, the present invention and the corresponding underlying problems will be explained in further detail in conjunction with resin transfer molding processes of high-tech composite components.

BACKGROUND

Industrial manufacturing of composite components relies on reproducibly controlling curing behavior of thermosetting materials since the properties of the final product heavily depend on the conditions of the curing process. Therefore, it is desirable to be able to closely monitor any such processes in real-time and in situ.

Among the possible measurement methods are dielectric analysis (DEA), dynamic mechanical analysis, thermomechanical analysis, thermogravimetric analysis and differential thermal analysis. DEA and the other measurement methods allow for gaining insights in the curing patterns of composite materials, adhesives, coatings or thermosetting resin systems. By employing one or more of the possible measurement methods, multiple physical characteristics such as dielectric loss factor, ion conductivity, viscoelastic properties, dynamic moduli, glass transition temperatures, crystallization temperatures, sublimation temperatures, or ion viscosity may be determined by way of measurement of dipole polarization and ion migration patterns.

SUMMARY

At least some of these objects are achieved by the subject-matter of the respective independent claims. Advantageous embodiments are described in the sub claims related to the independent claims.

According to a first aspect of the invention, a data acquisition system, in particular for dielectric analysis (DEA) measurements, includes a sensor interface configured to connect to one or more sensors located within an active machining zone of an industrial manufacturing machine, a module processor coupled to the sensor interface and configured to receive measurement values from one or more sensors connected to the sensor interface, a cloud interface coupled to the module processor, and a machine interface coupled to the module processor. The measurement values indicate physical properties of workpieces processed in the active machining zone of an industrial manufacturing machine. The cloud interface is configured to connect to cloud-based resources, and the machine interface is configured to connect to a controller of the industrial manufacturing machine. The module processor is configured to transmit the received measurement values from the one or more sensors to cloud-based resources via the cloud interface and to transmit manufacturing control signals to the controller of the industrial manufacturing machine via the machine interface, the manufacturing control signals being based on parameters received from cloud-based resources via the cloud interface.

According to a second aspect of the invention, a system for real-time in-line monitoring of industrial manufacturing processes includes an industrial manufacturing machine having one or more active machining zones and a controller, one or more sensors located within one or more of the active machining zones of an industrial manufacturing machine, and at least one data acquisition system according to the first aspect of the invention. The controller is connected to the machine interface of the data acquisition system and the one or more sensors are connected to the sensor interface of the data acquisition system. The controller of the industrial manufacturing machine is configured to control the operation of the industrial manufacturing machine based on manufacturing control signals received from the data acquisition system.

According to a third aspect of the invention, a method for real-time in-line monitoring of industrial manufacturing processes includes placing one or more sensors within one or more active machining zones of an industrial manufacturing machine, transmitting measurement values from the one or more sensors to a data acquisition system, the measurement values indicating physical properties of workpieces processed in the active machining zones of an industrial manufacturing machine, transmitting, by the data acquisition module, the received measurement values from the one or more sensors to cloud-based resources via a cloud interface of the data acquisition system, receiving parameters from cloud-based resources via the cloud interface at the data acquisition system, and transmitting manufacturing control signals to a controller of the industrial manufacturing machine, the manufacturing control signals being based on the parameters received from cloud-based resources.

With the modules, systems and methods of the invention, it is advantageously possible to characterize composite parts in terms of production costs, component quality and material behaviour during production. Having greater insight into those parameters allows for optimizing curing cycle times, for adapting to process variations from batch to batch and for exactly reproducing certain process environments. As the structural health and integrity of the final components depends on the presence or absence of filling or cure-induced defects which in turn depends on the filling and curing behaviour in situ a quality control may be implemented by closely monitoring the curing processes in real-time and in-line with the manufacturing machine.

Further, it is a particular advantage to employ cloud-based resources to analyse the measurement data generated in real-time and in situ. Such cloud-based resources may allow for pooling larger amounts of data from various manufacturing sites under different manufacturing conditions so that more information may be systematically extracted from the data. The employment of cloud-based resources in particular enables faster and more consistent creation of value by advanced data analytics in terms of predictability, quality control, pre-planning, optimization and/or robustness of manufacturing processes.

A feedback mechanism from the cloud-based resources back to the data acquisition module enables the data acquisition module to beneficially influence the local behaviour of the industrial manufacturing processes taking into account knowledge and insights gained by the data analytics performed in the cloud-based resources. Advantageously, the local industrial manufacturing processes are thus optimized not only with regard to the instantaneous local manufacturing conditions, but also with regard to statistical data reflecting experiences and predictions of other (spatially or temporally) remote industrial manufacturing processes under similar conditions.

According to some embodiments of the first aspect, the data acquisition module may further comprise a human-machine interface configured to connect to a human interface device via a databus. In some embodiments, the module processor may be configured to transmit the received measurement values from the one or more sensors to the human interface device via the human-machine interface. In some of those embodiments, the module processor may be configured to pre-process the received measurement values from the one or more sensors based on parameters received from cloud-based resources via the cloud interface before transmitting them to the human interface device. Advantageously, data pertaining to local manufacturing processes currently under progress may in this manner be enriched by additional statistical data as evaluated by cloud-based resources taking into account the current manufacturing conditions. Therefore, monitoring of the manufacturing processes may be easier for an operator as the process information is more comprehensive.

According to some further embodiments of the first aspect, the module processor may be configured to receive a trigger signal from the controller of the industrial manufacturing machine via the machine interface. Such trigger signals may indicate critical points in time in the received measurement values from the one or more sensors, such as dielectric sensors, ultrasonic sensors, thermogravimetric sensors, dynamic mechanical sensors, differential thermal sensors or the like. In some of those embodiments, the module processor may pre-process the received measurement values from the one or more sensors on the basis of the critical point in time indicated by the received trigger signal before transmitting the received measurement values to cloud-based resources via the cloud interface. Critical points may align the curves of the measured physical parameters with certain events during the manufacturing process, thereby enhancing the pre-conditions for meaningful statistical analysis of the measurement curves.

According to some embodiments of the second aspect the system may further comprise cloud-based resources connected to the cloud interface of the data acquisition system. In some embodiments, the system may comprise at least two data acquisition systems which may be coupled to each other via a common databus. In some of those embodiments, a first data acquisition system may be configured to transfer configuration data for the controller of the industrial manufacturing machine to a second data acquisition system via the common databus. Such implementation advantageously allows for parallelization of manufacturing processes under similar or equal circumstances by aligning the configuration of the data acquisition systems on the basis of overarching insights found by way of performing cloud-based or enterprise-based analytics of larger sets of data.

According to some embodiments of the second aspect, the industrial manufacturing machine may, for example, be a resin transfer molding machine having one or more cavities as active machining zone, and wherein the sensors are in-mold sensors placed in the mold cavity of the resin transfer molding machine.

According to some embodiments of the second aspect, the data acquisition system may include a sensor control device that allows modification of the measurement conditions of the one or more sensors during a manufacturing process of the industrial manufacturing machine. Under changing manufacturing conditions, the measurement conditions may be advantageously adapted in real-time in order to provide for more accurate, more reliable and adequately resolved measurement results. Using the cloud-based statistical analytics, such modification of the measurement conditions may be predictively planned in advance before the start of a specific manufacturing process.

According to some embodiments of the third aspect, the cloud-based resources or other enterprise-based computing resources may perform statistical analysis on the transmitted measurement values from the one or more sensors and output the parameters on the basis of the result of the performed statistical analysis.

According to some embodiments of the third aspect, the industrial manufacturing machine may be a composite manufacturing machine, for example a resin transfer molding machine having a mold cavity as active machining zone. In some of those embodiments, the sensors may be in-mold sensors placed in a mold cavity of the composite manufacturing machine. Such sensors may for example be configured to measure electrical responses of thermosetting resins in the mold cavity close to the sensor surface of the in-mold sensors.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

Figure 1:
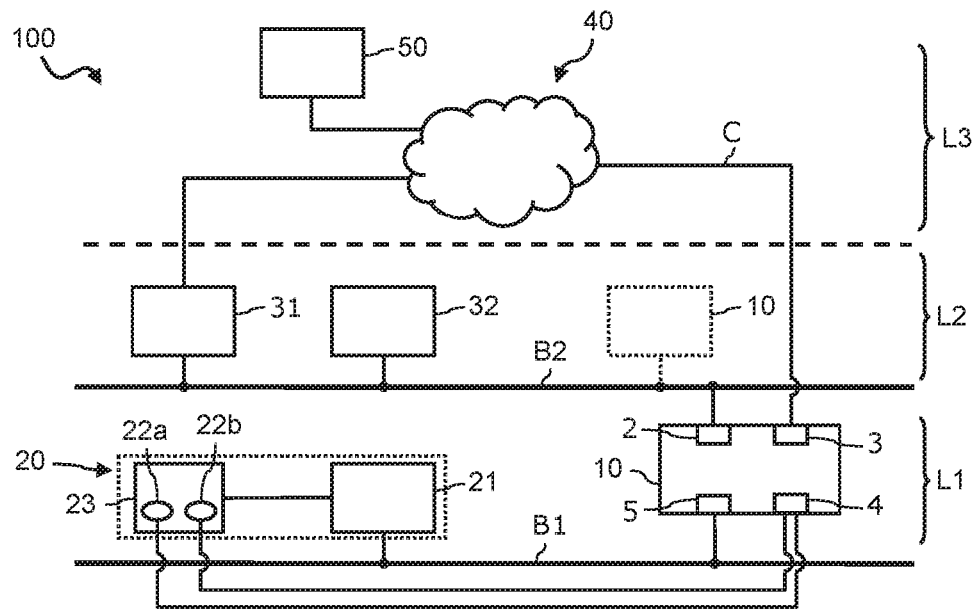
FIG. 1 schematically illustrates a system for real-time in-line monitoring of industrial manufacturing processes according to an exemplary embodiment of the invention.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

FIG. 1 schematically illustrates a system 100 for real-time in-line monitoring of industrial manufacturing processes taking place in one or more industrial manufacturing machines 20, such as for example a resin transfer molding machine or in general a composite manufacturing machine. The industrial manufacturing machines 20 may be located in a manufacturing enterprise and may be functionally located on a machine level, exemplarily indicated with the reference sign "L1" in FIG. 1. Although there is only one industrial manufacturing machine 20 explicitly shown in FIG. 1, it should be clear that the manufacturing enterprise may employ more than one industrial manufacturing machine 20. The industrial manufacturing machine 20 may generally include an active machining zone 23, in which a manufacturing process may take place. The active machining zone 23 may for example be a mold cavity—in the exemplary configuration as a resin transfer molding (RTM) machine—, but may include any other operational components as well.

The operation of the industrial manufacturing machine 20 is generally controlled by a machine controller 21, which may for example be a programmable logic controller (PLC) or any other programmable industrial digital computer that is specifically adapted for controlling industrial manufacturing processes in a rugged environment. The machine controller 21 is connected by a first databus B1 to a data acquisition system 10 by a machine interface 5.

Within the active machining zone 23, one or more sensors 22a, 22b may be located, for example as in-mold sensors in a mold cavity 23 of an RTM machine. The sensors may for example be dielectric sensors such as interdigitated electrode sensors or plate electrode capacitance sensors. It may also be possible to employ additionally or alternatively other sensor types such as ultrasonic sensors, temperature sensors, dynamin mechanical sensors, stress gauges, differential thermal sensors or the like. There are only two sensors 22a, 22b explicitly shown in FIG. 1, but it should be understood that more than two sensors of the same or different type, sensitivity and re-usability may be employed as well.

The sensors 22a, 22b are coupled to a sensor interface 4 of the data acquisition system 10. The coupling may either be by wire, in which case the sensor interface 4 of the data acquisition system 10 may include various sensor interface ports 4a to 4n for any number of sensors. Alternatively or additionally, the sensors 22a, 22b may also be coupled to the data acquisition system 10 wirelessly, for example via a radio-frequency data link. To that end, the data acquisition system 10 may include one or more wireless communication adapters 11, 12 and/or 13 which are configured to establish a radio-frequency or optical data link with the sensors 22a, 22b, for example as an mobile ad hoc network (MANET) that is dynamically formed without infrastructure and continuously self-configures among the participating network nodes. The wireless communication adapters 11, 12 and/or 13 may for example include WiFi, WLAN, Bluetooth®, IrDA, LiFi, visible light communication (VLC), RFID, ZigBee, or other suitable data exchange protocols.

Figure 2:
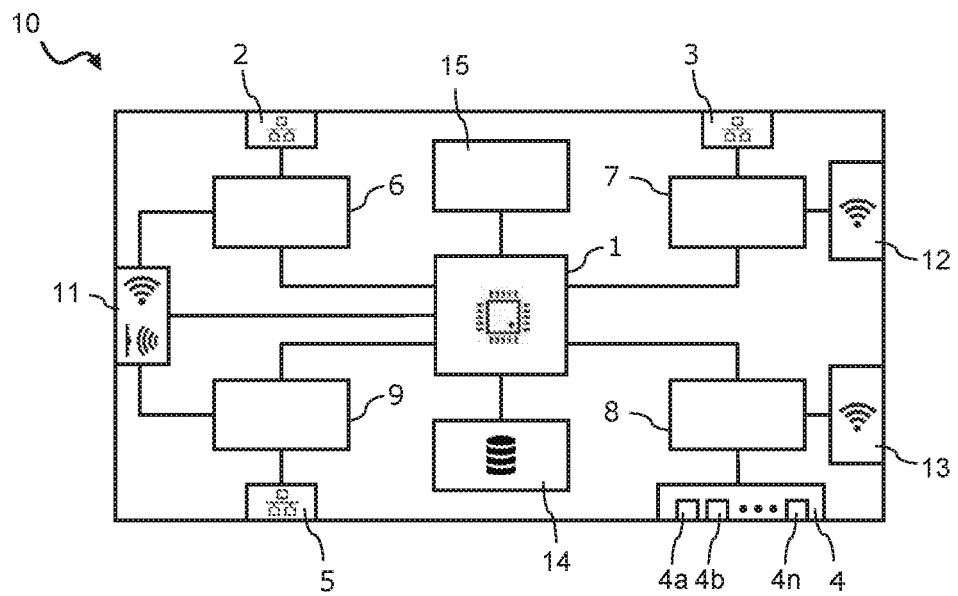
FIG. 2 schematically illustrates a dielectric analysis data acquisition module according to an exemplary embodiment of the invention.

The machine level L1 also involves a data acquisition system 10 for measurements that is shown in more detail in FIG. 2. It includes the sensor interface 4 coupled to a sensor control device 8. By means of the sensor control device 8, the measurement conditions of the sensors 22a, 22b may be modified on the fly, i.e. during a manufacturing process of the industrial manufacturing machine 20.

A module processor 1 as central computing unit within the data acquisition system 10 is configured to receive dielectric measurement values from one or more sensors 22a, 22b connected to the sensor interface 4. The data acquisition system 10 additionally includes a cloud interface 3 that is coupled to the module processor 1 via a cloud access device 7. The cloud interface 3 may be connected to cloud-based resources as generally indicated with the reference sign 40 in FIG. 1, by any type of wireless, wired or mixed connection link C.

The term "cloud" and "cloud-based resources" within the meaning of the present disclosure is used to denote evolving networks of volatile arrangement that may communicate among each other via a common data network, such as the Internet.

Those "cloud-based resources" may generally be located in a hierarchically upper data analysis level L3 and need not be physically located in the vicinity of the manufacturing system 100 as such. "Cloud-based resources" may include any type of cloud service, such as application clouds, infrastructurel clouds, client clouds, platform clouds, server clouds and other types of evolving networks. Clouds may enable any cloud participant to store and retrieve data in a distributed manner of various resources of the cloud. Clouds may perform various services to third party entities, such as platforms as a service (PaaS), software as a service (SaaS) or infrastructure as a service (IaaS). While clouds may be available to third parties in general, operation of cloud-based resources may be provided for by a specific cloud service provider. By way of clouds, remote accesses to the data acquisition module 10 or other local devices in the manufacturing system 10 may be made, for example by remote computing devices 50 for purposes of re-configuration and/or maintenance.

Measurement values retrieved from the sensors 22a, 22b in the data acquisition system 10 may be processed in the module processor 1 and may be transmitted by way of the cloud access device 7 to cloud-based resources 40 via the cloud interface 3. The measurement values generally indicate physical properties of workpieces processed in the active machining zone 23 of an industrial manufacturing machine 20, such as for example dielectric permittivity, dielectric loss factor, ion conductivity, viscoelastic properties, dynamic moduli, glass transition temperatures, crystallization temperatures, sublimation temperatures, or ion viscosity. These physical parameters may be determined by way of measurement of dipole polarization and ion migration patterns.

In order to prepare the measurement values retrieved from the sensors 22a, 22b for better analysis in the cloud-based resources 40 or in other enterprise-based computing resources, the module processor 1 may monitor or poll the machine controller 21 for trigger signals that indicating critical points in time in the received measurement values. For example, the opening or closing of the mold cavity 23 of an RTM machine 20 may be such a critical point in time which may then be aligned with the measurement curve of the measurement values. The module processor 1 may particularly pre-process the received measurement values from the sensors 22a, 22b on the basis of the relevant or associated critical points in time indicated by the received trigger signals. Such pre-processed measurement values may then be transmitted to the cloud-based resources 40 via the cloud interface 3 for a more thorough and valuable data analysis.

The module processor 1 receives parameters from the cloud-based resources 40 that include predictive or analytic information about manufacturing conditions, expected manufacturing results and similar. Those parameters may be taken into account by the module processor 1 when transmitting manufacturing control signals to the controller 21 of the industrial manufacturing machine 20 via the machine interface 5. The module processor 1 may analyse the parameters in order to optimally set manufacturing conditions in the industrial manufacturing machine 20. To that end, the data acquisition system 10 may include a machine control device 9 that is specifically dedicated to translate configuration signals into machine-readable instructions for transmission to the machine controller 21.

As illustrated in FIG. 1, there may be a control level generally indicated with the reference sign "L2" in which a human interface device (HID) 32 as well as a manufacturing enterprise server 31 as an enterprise-based computing resource may be located. The HID 32 may be connected to the data acquisition system 10 via a common databus B2 to a human-machine interface 2 of the data acquisition system 10. The module processor 1 may transmit any of the measurement values retrieved from sensors 22a, 22b or parameters and statistical analysis results from the cloud-based resources 40 to the HID 32 for a human operator or user to review and evaluate manually. To that end, the module processor 1 may be configured to pre-process the received measurement values from the sensors 22a, 22b on the basis of the parameters received from cloud-based resources 40 before transmitting them to the HID 32. That way, the operator using the HID 32 may be able to get a clearer picture for purposes of quality control, process control and/or process monitoring.

It may also be possible for a human operator to directly control or supervise the operation of the data acquisition system 10, for example by means of a user input panel 15 included in the data acquisition system 10. A data storage 14 in the data acquisition system 10 coupled to the module processor 1 may hold operating system and/or configuration data as well as temporary measurement value data for the human operator to work on using the user input panel 15.

The common databus B2 may also be employed to couple two or more data acquisition systems 10 (one of which is illustrated by a dashed box in FIG. 1) among each other. Each of the data acquisition systems 10 may then be able to transfer configuration data for a controller 21 of an industrial manufacturing machine 20 to other data acquisition systems 10 via the common databus B2. It may also be possible to transfer configuration data via an enterprise-based computing resource, such as a computer of an enterprise-wide network to which the data acquisition systems 10 may be connected, for example the manufacture enterprise server 31.

Figure 3:
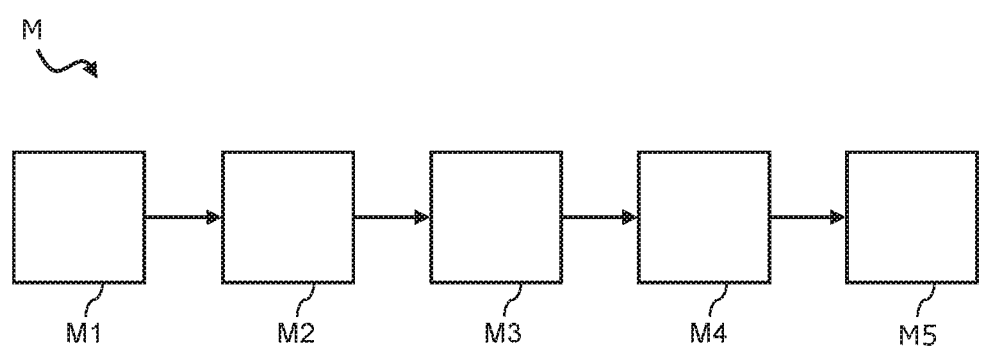
FIG. 3 schematically illustrates a flowchart of stages of a method for real-time in-line monitoring of industrial manufacturing processes according to an exemplary embodiment of the invention.

FIG. 3 schematically illustrates a flowchart of stages of a method M for real-time in-line monitoring of industrial manufacturing processes. The method M may in particular be implemented in the manufacturing system 100 as illustrated in conjunction with FIG. 1. The method M may employ a data acquisition system, such as the data acquisition system as explained in conjunction with FIG. 2

In a first stage M1, one or more sensors 22a, 22b are placed within an active machining zone 23 of an industrial manufacturing machine 20. For example, the industrial manufacturing machine 20 may be a composite manufacturing machine, such as a resin transfer molding machine having a mold cavity as active machining zone 23. The sensors 22a, 22b may be dielectric sensors that are employed as in-mold sensors which are placed in this mold cavity. The dielectric sensors 22a, 22b may then measure electrical responses of thermosetting resins in the mold cavity close to the sensor surface of the in-mold sensors.

The measurement values are transmitted in a second stage M2 from the sensors 22a, 22b to a data acquisition system 10. The measurement values indicate physical properties of workpieces processed in the active machining zone 23 of the industrial manufacturing machine 20.

The data acquisition system 10 transmits the received measurement values in a third stage M3 to cloud-based resources 40 via a cloud interface 3 of the data acquisition system 10 where statistical analysis on the transmitted measurement values from the sensors 22a, 22b may be performed. As a result of the performed statistical analysis, parameters may be transmitted back to the data acquisition system 10 where they are received in a fourth stage M4 via the cloud interface 3 at the data acquisition system 10.

The data acquisition system 10 then transmits manufacturing control signals in a fifth stage M5 to a controller 21 of the industrial manufacturing machine 20. These manufacturing control signals are based on the parameters received from cloud-based resources 40 in order to optimize the operation of the industrial manufacturing machine 20 in real-time or at least near real-time.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

The invention claimed is:

1. A data acquisition system, in particular for dielectric analysis measurements, comprising:
   a sensor interface configured to connect to one or more dielectric or ultrasonic sensors located within an active machining zone of an industrial manufacturing machine;
   a module processor coupled to the sensor interface and configured to receive measurement values from the one or more sensors connected to the sensor interface, the measurement values indicating physical properties of workpieces processed in the active machining zone of an industrial manufacturing machine;
   a cloud interface coupled to the module processor, the cloud interface being configured to connect to cloud-based resources; and
   a machine interface coupled to the module processor, the machine interface being configured to connect to a controller of the industrial manufacturing machine,
   wherein the module processor is configured to transmit the received measurement values from the one or more sensors to cloud-based resources via the cloud interface and to transmit manufacturing control signals to the controller of the industrial manufacturing machine via the machine interface, the manufacturing control signals being based on parameters received from cloud-based resources via the cloud interface, and wherein the module processor is configured to receive a trigger signal from the controller of the industrial manufacturing machine via the machine interface, the trigger signal indicating a critical point in time in the measurement values from the one or more sensors.

2. The data acquisition system according to claim 1, further comprising:
a human-machine interface configured to connect to a human interface device via a databus, the module processor being configured to transmit the received measurement values from the one or more sensors to the human interface device via the human-machine interface.

3. The data acquisition system according to claim 2, wherein the module processor is configured to pre-process the received measurement values from the one or more sensors based on parameters received from the cloud-based resources via the cloud interface or based on enterprise-based resources before transmitting the received measurement values to the human interface device.

4. The data acquisition system according to claim 1, wherein the module processor is configured to pre-process the received measurement values from the one or more sensors on the basis of the critical point in time indicated by the received trigger signal before transmitting the received measurement values to the cloud-based resources via the cloud interface or to the enterprise-based resources.

5. A system for real-time in-line monitoring of industrial manufacturing processes, the system comprising:
at least one industrial manufacturing machine having one or more active machining zones and a controller;
one or more sensors located within the one or more active machining zones of the at least one industrial manufacturing machine; and
at least one data acquisition system, including:
a sensor interface configured to connect to the one or more sensors located within the one or more active machining zones;
a module processor coupled to the sensor interface and configured to receive measurement values from the one or more sensors connected to the sensor interface, the measurement values indicating physical properties of workpieces processed in the one or more active machining zones;
a cloud interface coupled to the module processor, the cloud interface being configured to connect to cloud-based resources; and
a machine interface coupled to the module processor, the machine interface being configured to connect to the controller of the at least one industrial manufacturing machine,
wherein the module processor is configured to transmit the received measurement values from the one or more sensors to the cloud-based resources via the cloud interface and to transmit manufacturing control signals to the controller of the at least one industrial manufacturing machine via the machine interface, the manufacturing control signals being based on parameters received from cloud-based resources via the cloud interface;
the controller being connected to the machine interface of the data acquisition system, and the one or more sensors being connected to the sensor interface of the data acquisition system,
wherein the controller is configured to control the operation of the at least one industrial manufacturing machine based on the manufacturing control signals received from the data acquisition system,
wherein the module processor is configured to receive a trigger signal from the controller of the industrial manufacturing machine via the machine interface, the trigger signal indicating a critical point in time in the measurement values from the one or more sensors, and
wherein at least one of the one or more sensors is a dielectric or ultrasonic sensor.

6. The system according to claim 5, further comprising:
the cloud-based resources connected to the cloud interface of the data acquisition system.

7. The system according to claim 5, comprising at least two data acquisition systems, the at least two data acquisition systems coupled to each other via a common databus or via an enterprise-based computing resource.

8. The system according to claim 7, wherein a first one of the at least two data acquisition systems is configured to transfer configuration data for the controller of the industrial manufacturing machine to a second one of the at least two data acquisition systems via the common databus.

9. The system according to claim 5, wherein the industrial manufacturing machine is a composite manufacturing machine, in particular a resin transfer molding machine having a mold cavity as an active machining zone, and wherein the one or more sensors are in-mold sensors placed in the mold cavity of the composite manufacturing machine.

10. The system according to claim 5, wherein the at least one data acquisition system includes a sensor control device configured to modify measurement conditions of the one or more sensors during a manufacturing process of the industrial manufacturing machine.

11. A method for real-time in-line monitoring of industrial manufacturing processes, the method comprising:
placing one or more sensors within an active machining zone of an industrial manufacturing machine;
transmitting measurement values from the one or more sensors to a data acquisition system, the measurement values indicating physical properties of workpieces processed in the active machining zone of the industrial manufacturing machine;
transmitting, by the data acquisition system, the received measurement values from the one or more sensors to cloud-based resources via a cloud interface of the data acquisition system;
receiving parameters from the cloud-based resources via the cloud interface at the data acquisition system; and
transmitting manufacturing control signals to a controller of the industrial manufacturing machine, the manufacturing control signals being based on the parameters received from cloud-based resources or enterprise-based computing resources;
wherein a module processor of the data acquisition system is configured to receive a trigger signal from the controller of the industrial manufacturing machine via a machine interface coupled to the module processor, the trigger signal indicating a critical point in time in the measurement values from the one or more sensors; and
wherein at least one of the one or more sensors is a dielectric or ultrasonic sensor.

12. The method according to claim 11, wherein the cloud-based resources or enterprise-based computing resources perform statistical analysis on the transmitted measurement values from the one or more sensors and output the parameters on the basis of a result of the performed statistical analysis.

13. The method according to claim 11, wherein the industrial manufacturing machine is a composite manufacturing machine, in particular a resin transfer molding machine having a mold cavity as the active machining zone, and wherein the one or more sensors are in-mold sensors placed in the mold cavity of the composite manufacturing machine.

14. The method according to claim 11, wherein at least one of the one or more sensors is an ultrasonic sensor.

\* \* \* \* \*